(12) United States Patent
Raghothaman et al.

(10) Patent No.: US 7,907,571 B2
(45) Date of Patent: Mar. 15, 2011

(54) MOBILE AWARE BEACON

(75) Inventors: Balaji Raghothaman, Hollis, NH (US);
Rayadurgam Ravikanth, Acton, MA (US)

(73) Assignee: Airvana, Corp., Chelmsford, MA (US)

( * ) Notice: Subject to any disclaimer, the term of this patent is extended or adjusted under 35 U.S.C. 154(b) by 98 days.

(21) Appl. No.: 12/495,125

(22) Filed: Jun. 30, 2009

(65) Prior Publication Data
US 2010/0329132 A1    Dec. 30, 2010

(51) Int. Cl.
*H04Q 7/00* (2006.01)
(52) U.S. Cl. ......................... 370/331; 370/332
(58) Field of Classification Search .......... 370/329, 370/331, 332, 333, 341, 349, 310.2, 328
See application file for complete search history.

(56) References Cited

U.S. PATENT DOCUMENTS

| | | | |
|---|---|---|---|
| 5,946,612 A * | 8/1999 | Johansson | 455/405 |
| 5,974,320 A * | 10/1999 | Ward et al. | 455/437 |
| 5,995,835 A * | 11/1999 | De Seze et al. | 455/436 |
| 6,035,197 A * | 3/2000 | Haberman et al. | 455/439 |
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 6,801,772 B1 * | 10/2004 | Townend et al. | 455/436 |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 7,558,356 B2 | 7/2009 | Pollman et al. | |
| 7,558,588 B2 | 7/2009 | To et al. | |
| 2002/0196749 A1 | 12/2002 | Eyuboglu et al. | |
| 2003/0100311 A1 | 5/2003 | Chung et al. | |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |
| 2006/0067451 A1 | 3/2006 | Pollman et al. | |
| 2006/0126509 A1 | 6/2006 | Abi-Nassif | |
| 2006/0159045 A1 | 7/2006 | Ananthaiyer et al. | |
| 2006/0240782 A1 | 10/2006 | Pollman et al. | |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Rao et al. | |

(Continued)

FOREIGN PATENT DOCUMENTS

GB    2452688    3/2009

OTHER PUBLICATIONS

3rd Generation Partnership Project 2 "3GPP2", "cdma2000 High Rate Packet Data Interface Specification", C.S0024, version 2, Oct. 27, 2000 (441 pages).

(Continued)

*Primary Examiner* — Brenda Pham
(74) *Attorney, Agent, or Firm* — Fish & Richardson P.C.

(57) ABSTRACT

Techniques for reducing beacon interference include identifying a mobile device located within a coverage area serviced by a first access point, determining a power of a signal transmitted by a mobile device to a second access point; and modifying the beacon to reduce interference.

15 Claims, 4 Drawing Sheets

U.S. PATENT DOCUMENTS

| | | | |
|---|---|---|---|
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Sharma et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0103499 A1 * | 4/2009 | Hofmann et al. ............. 370/336 |
| 2009/0116445 A1 | 5/2009 | Samar et al. |
| 2009/0154447 A1 | 6/2009 | Humblet |
| 2009/0156165 A1 | 6/2009 | Raghothaman et al. |
| 2009/0156195 A1 | 6/2009 | Humblet |
| 2009/0156218 A1 | 6/2009 | Garg et al. |
| 2009/0163202 A1 | 6/2009 | Humblet et al. |
| 2009/0163216 A1 | 6/2009 | Hoang et al. |
| 2009/0163238 A1 | 6/2009 | Rao et al. |
| 2009/0164547 A1 | 6/2009 | Ch'ng et al. |
| 2009/0168766 A1 | 7/2009 | Eyuboglu et al. |
| 2009/0168788 A1 | 7/2009 | Den et al. |
| 2009/0170440 A1 | 7/2009 | Eyuboglu et al. |
| 2009/0170475 A1 | 7/2009 | Ch'ng |
| 2009/0170520 A1 | 7/2009 | Jones |
| 2009/0170547 A1 | 7/2009 | Raghothaman et al. |
| 2009/0172169 A1 | 7/2009 | Ch'Ng et al. |
| 2009/0172397 A1 | 7/2009 | Kim |

OTHER PUBLICATIONS

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

Paul Bender, et al., "CDMA/HDR: A Bandwidth-Efficient High-Speed Wireless Data Service for Nomadic Users", IEEE Communications Magazine, Jul. 2000.

Paul Bender & Ramin Rezalifar, "Draft Baseline Text for the 1xEV-DO Upper Layers (excluding Physical Layer)", 3GPP2, Aug. 17, 2000.

TIA/EIA/TSB-115, "Wireless IP Architecture Based on IETF Protocols", Jun. 6, 2000.

3GPP2, "Wireless IP Network Standard", 3rd Generation Partnership Project 2 (3GPP2), Version 1.0.0, Jul. 14, 2000.

* cited by examiner

MOBILE AWARE BEACON

BACKGROUND

This description relates to a mobile aware beacon.

3G ("third generation") networks are widely deployed networks that provide users with a wide range of wireless services including wireless voice telephone, video calls, and broadband wireless data. Examples of 3G technology are HSPA and EVDO. Advances in telecommunications technology has brought forth a newly developed technology referred to as 4G ("fourth generation"). Examples of 4G technology include long-term evolution (LTE) and WiMAX. 4G networks are currently being deployed. Generally, 3G networks, such as EVDO, have wide coverage whereas 4G networks, such as WiMAX and LTE, have limited coverage, which is usually concentrated in larger cities.

High Data Rate (HDR) is an emerging mobile wireless access technology that enables personal broadband Internet services to be accessed anywhere, anytime (see P. Bender, et al., "CDMA/HDR: A Bandwidth-Efficient High-Speed Wireless Data Service for Nomadic Users", IEEE Communications Magazine, July 2000, and 3GPP2, "Draft Baseline Text for 1xEV-DO," Aug. 21, 2000). Developed by Qualcomm, HDR is an air interface optimized for Internet Protocol (IP) packet data services that can deliver a shared forward link transmission rate of up to 2.46 Mbit/s per sector using only (1X) 1.25 MHz of spectrum. Compatible with CDMA2000 radio access (TIA/EIA/IS-2001, "Interoperability Specification (IOS) for CDMA2000 Network Access Interfaces," May 2000) and wireless IP network interfaces (TIA/EIA/TSB-115, "Wireless IP Architecture Based on IETF Protocols," Jun. 6, 2000, and TIA/EIA/IS-835, "Wireless IP Network Standard," 3rd Generation Partnership Project 2 (3GPP2), Version 1.0, Jul. 14, 2000), HDR networks can be built entirely on IP technologies, all the way from the mobile Access Terminal (AT) to the global Internet, thus taking advantage of the scalability, redundancy and low-cost of IP networks.

An EVolution of the current 1xRTT standard for high-speed data-only (DO) services, also known as the 1xEV-DO protocol has been standardized by the Telecommunication Industry Association (TIA) as TIA/EIA/IS-856, "CDMA2000 High Rate Packet Data Air Interface Specification", 3GPP2 C.S0024-0, Version 4.0, Oct. 25, 2002, which is incorporated herein by reference. Revision A to this specification has been published as TIA/EIA/IS-856, "CDMA2000 High Rate Packet Data Air Interface Specification", 3GPP2 C.S0024-A, Version 2.0, June 2005, and is also incorporated herein by reference.

SUMMARY

In general, in one aspect, the application describes methods and computer programs performed at a first access point for reducing beacon interference. The methods and computer programs include estimating whether a mobile device is located within a coverage area serviced by the first access point; determining the reverse link received signal strength; using this signal strength as a measure of the received signal strength from a nearby mobile, and using the measure to estimate the amount of interference caused by the beacon to the mobile; determining the power exceeds a predefined threshold; and modifying the beacon to reduce the beacon interference with the communications.

In general, in another aspect, the application describes an access point configured to transmit a beacon for attracting mobile devices. The access point includes a receiver for transmitting and receiving voice and data; and a processor. The processor is configured to cause the receiver to periodically listen for increase in received signal strength caused by mobile devices located within a coverage area serviced by the access point that are communicating with another access point; estimate whether a mobile device is located within a coverage area serviced by the first access point; determine the reverse link received signal strength; use this signal strength as a measure of the received signal strength from a nearby mobile, use the measure to estimate the amount of interference caused by the beacon to the mobile; determine the power exceeds a predefined threshold; and modify the beacon to reduce interference of the beacon with the communications.

Advantages of particular implementations include one or more of the following. Beacon interference at the mobile may be reduced or eliminated. In some standards, e.g., CDMA, the mobile detection functionality may be implemented without the need for additional hardware, e.g., by temporarily using the data-only receiver. Other features and advantages will become apparent from the description and the claims.

DETAILED DESCRIPTION

Cellular wireless communications systems are designed to serve many mobile stations distributed in a large geographic area by dividing the area into areas, often referred to as "cells." At or near the center of each cell, a radio network access point, also referred to as a base transceiver station (BTS), is located to serve mobile devices or "mobiles" (e.g., cellular telephones, laptops, PDAs) located in the cell.

In wireless communication networks, the geographic areas served by access points, also referred to as "service areas," may vary in size and may include smaller service areas and/or may be located within larger service areas. Larger geographic areas that include one or more smaller service areas are referred to as "macro cell areas," and an access point that serves a macro cell area is referred to as a "macro access point (AP)." Within a macro cell area, one or more access points (referred to as "femto access points") may be located to serve smaller geographic areas (referred to as "femto cells").

For example, femto access points may be deployed in a user's home or in enterprises, e.g., company buildings or campuses, in the same manner as a WiFi® access point. Compared to macro access points, femto access points have smaller power and transmission ranges and may be set up independently. Because femto access points are generally set up in an ad-hoc, scalable fashion, they may not be entirely coordinated with macro network which is static in nature and whose power, range direction, and location are more carefully planned. Femto access points maybe aware of other femto access points nearby, and their knowledge of each other may or may not be exact.

Figure 1:
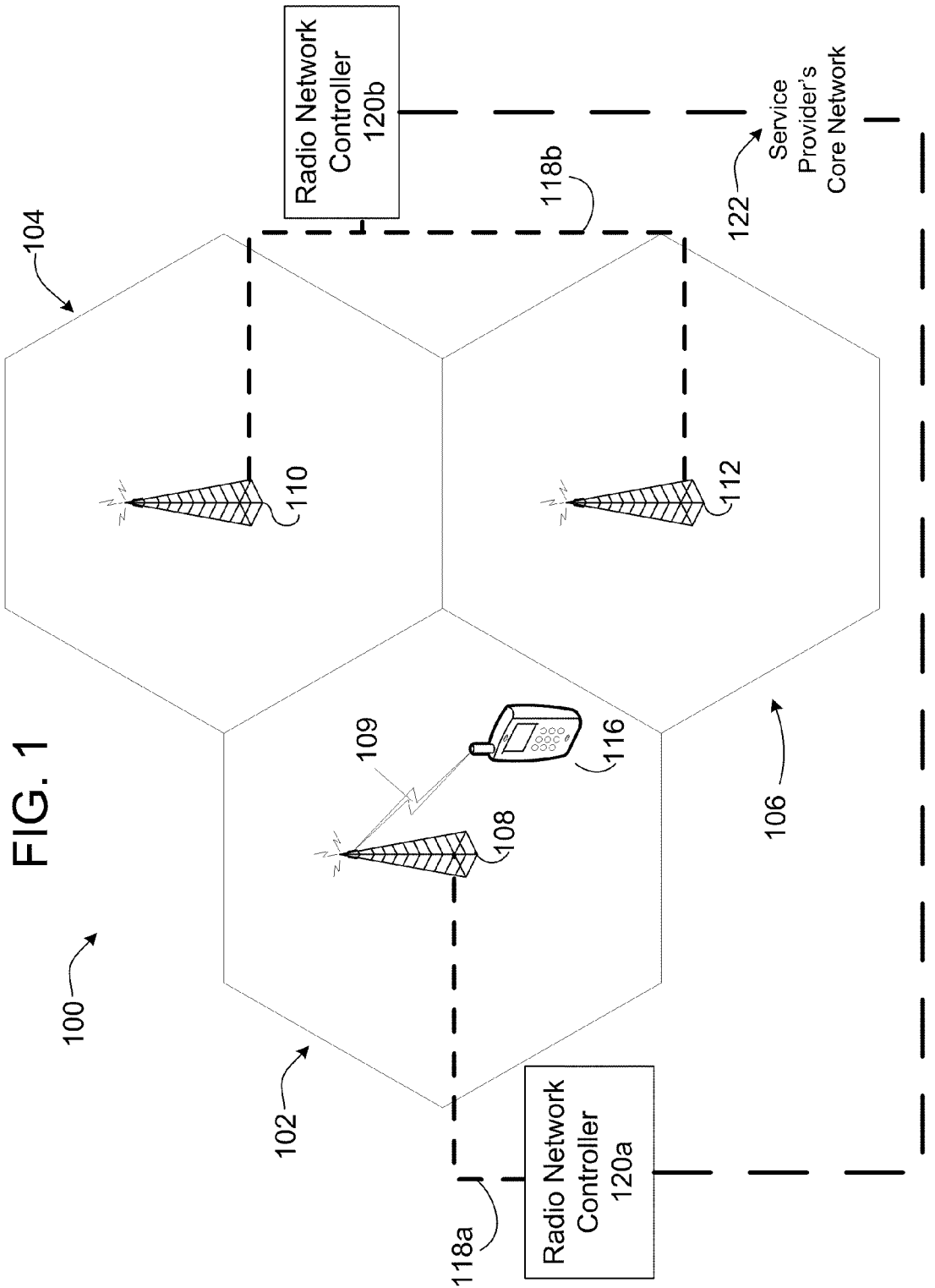
FIG. 1 is a block diagram of a radio access network (RAN).

Referring to FIG. 1, a radio access network (RAN) 100 includes multiple access points or "macro cells" 108, 110, and 112 located in macro cell areas 102, 104, and 106, respectively. The macro cell areas 102, 104, and 106 can include one or more femto cells (not shown). The macro cells 108, 110, and 112 are each configured to communicate with a mobile station over an airlink. For example, the macro cell 108 communicates with the mobile station 116 over an airlink 109. Macro cells 108, 110, and 112 are connected over a backhaul connection (e.g., backhaul connection 118a or 118b) to a radio network controller (RNC) which in turn communicates with the service provider's core network, e.g., RNC 120a or 120b, which may be one or more physical devices at different locations.

The RAN 100 is configured to support various mobile wireless access technologies, examples of which include UMTS and CDMA 2000. Other wireless communication standards may also be used. Examples of these include CDMA 1xEV-DO, CDMA2000, WiMax, WiBro, WiFi, and the like.

Figure 2:
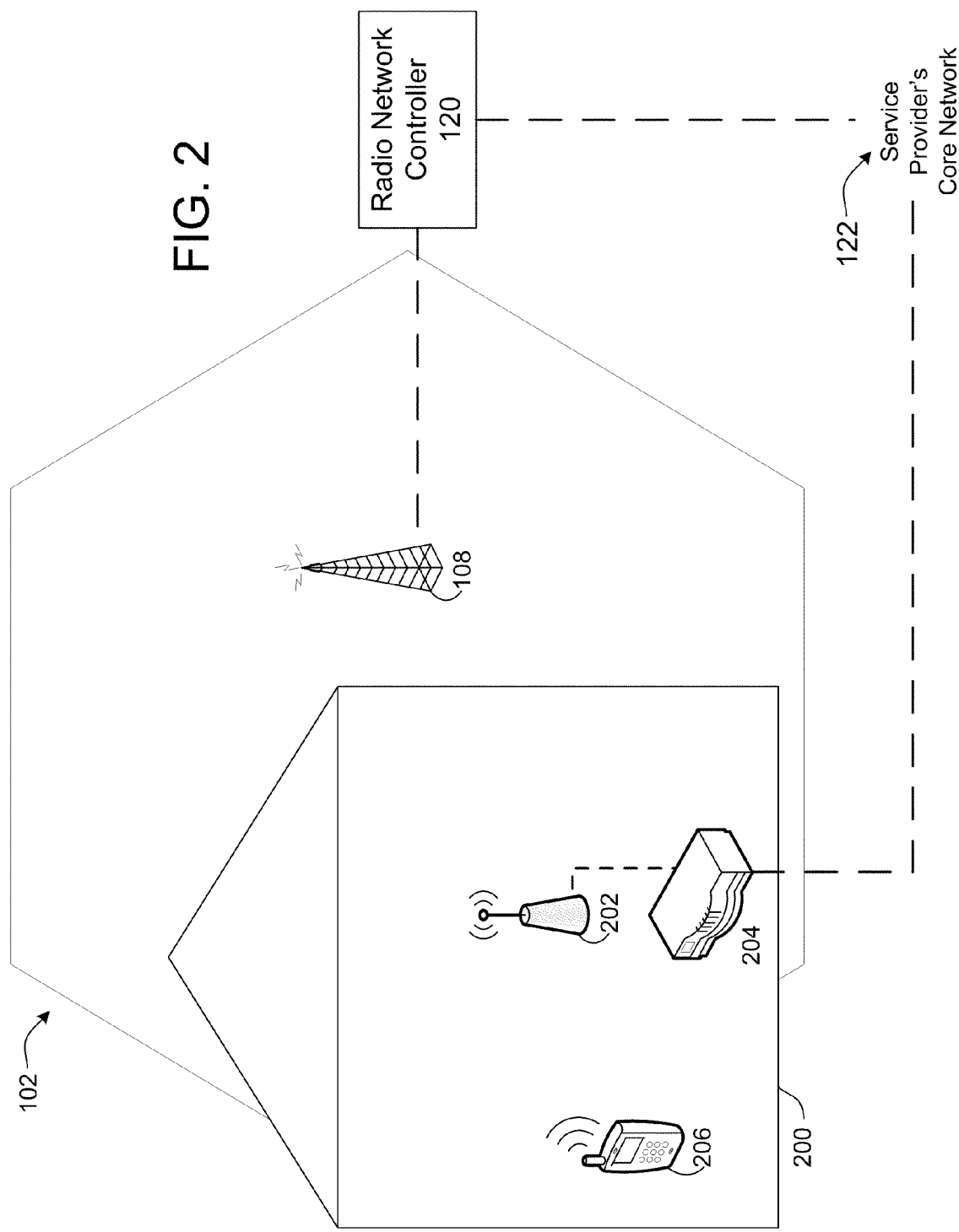
FIG. 2 is a block diagram of macro/femto area.

Referring to FIG. 2, a femto cell 202 is deployed within the macro coverage area. The femto cell 202 may use any available high-speed internet connection device 204 to connect to a service provider's core network 122. The femto cell 202 may be installed anywhere that it is advantageous to do so, for example, in a private or public space. When an authorized mobile station 206 is present inside the home or anywhere within range of the femto cell 202, it may use the femto cell 202 rather than a regular cellular radio network access point (e.g., macro access point 108) to place or receive voice calls and data connections, even if it is otherwise within the cell 102 covered by macro access point 108.

A mobile that is actively communicating with the macro access point 108 or any other access point is referred to as an "active" mobile, and one that is not in communication with any access point is referred to as an "inactive" or "idle" mobile. The femto access point 202 transmits a beacon to advertise its presence to attract mobiles. Upon receiving a beacon signal with a stronger signal strength than the macro access point, an inactive mobile will attempt to establish a connection with the femto access point 202 using information that it derives from the beacon. For example, the beacon indicates the service frequency used by the femto access point 202 to communicate with mobiles. The beacon is generally transmitted at different frequencies on which mobiles could potentially be listening. In one example, the femto access point uses frequency f2 as a service frequency and emits a beacon that hops over multiple frequencies, f1, f3, f4, and f5, any one of which could be used by the macro access point 108 for communicating with the mobile, e.g., frequency f1. If the mobile is already communicating with the macro access point 108 on frequency f1, the beacon transmitted by the femto access point 202 at frequency f1 is likely interfere with communications between the mobile and the macro access point 108, in the absence of handoff from the macro to the femto ( this is hand-in, it is a more advanced feature, and is not likely in early version of femtocell systems deployed). This interference depends, among other things, on the distances between the macro access point 108 and the femto access point 202, and overall results in degradation of active calls being serviced by the macro access point 108 on the same frequency f1.

To counter the problem of beacon interference, the femto access point 202 estimates whether a mobile device is located within its coverage area; determines the reverse link received signal strength. The determination is made by listening for signals on the frequency it is going to transmit a beacon on. When it detects a signal on such a frequency it can be inferred that there us a mobile transmitting at that frequency. The femto access point 202 uses this signal strength as a measure of the received signal strength from a nearby mobile, and uses the measure to estimate the amount of interference caused by the beacon to the mobile. If the femto access point 202 determines that the power exceeds a predefined threshold; it modifies the beacon to reduce the beacon interference with the communications signal. This interference is particularly troublesome for voice transmissions since even slight interference can cause irretrievable packet loss and interruptions of voice frames.

The femto access point 202 responds to a measurement passing the threshold by temporarily modifying the beacon to reduce its interference with the macro/mobile communications. Such modification includes shutting off the beacon and reducing its coverage area, i.e., reducing the strength of the beacon.

Figure 3:
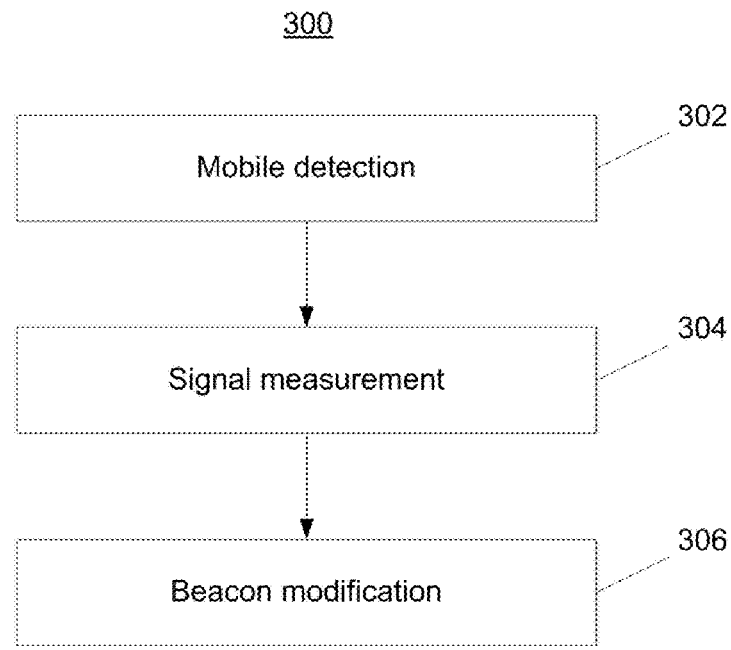
FIG. 3 is a flow diagram of active mobile detection.

Referring to FIG. 3, a process 300 performed at the femto access point 202 for managing a beacon includes a mobile detection process 302, a measurement process 304 and a beacon adjustment process 306. During the detection process 302, the femto access point 202 performs a sniffing routine upon power up. From the sniffing routing, the femto access point 202 measures the transmit power of any nearby macro access points, e.g., macro access point 108. From this measurement and other operating parameters of the macro access point 108 that were provided to the femto access point 202 during deployment, e.g., by an operator, the femto access point calculates a threshold. As described above, the threshold is a value (in dB) that represents how far above ambient noise the received power from the mobile (as measured by the femto access point 202) should be for the beacon to interfere with the mobile. If the received power exceeds the threshold, the femto access point takes action to reduce or eliminate beacon interference (e.g., shutting off or subduing the beacon). A detailed explanation describing the process by which the femto access point 202 determines the threshold value is provided further below.

The detection process 302 periodically measures the signal strength on the reverse link corresponding to each beacon frequency. In some embodiments, the measurements are derived from an RSSI (received signal strength indication) measurement. In implementations that use separate Tx/Rx channels for voice transmission and data transmission, the detection process 302 temporarily appropriates or "steals" the data-only receiver and uses it to perform the signal strength measurements. Thus, no additional hardware is required to perform the detection process 302 because the existing hardware, i.e., the data-only receiver, is periodically tuned over to frequencies used by mobiles to communicate with nearby macro access points. Such implementations include CDMA, which generally uses a CDMA 2000 1xRTT network for voice transmission and an EVDO network for data transmission. In other implementations an additional receiver may be used to perform the detection process 302.

In some implementations, the detection process 302 uses the data-only receiver to search for nearby mobiles communicating with a macro access point in the 1x frequency (used for voice transmissions). The process 302 tunes the receiver over to one or more 1x frequencies that may be used by mobiles for voice transmission.

The femto access point 202 performs a measurement process 304 in which it measures the received signal signal strength. The receiver looks for a mobile in communication with a macro access point over a number of predefined frequences. The measurement process 304 takes a measurement of received signal strength and compares it to a threshold determined by signal equations. As described in greater detail below, the threshold is based on prior knowledge of the distance between the macro access point and the mobile, as well as the distance between the macro access point and the femto access point. The farther away the mobile is from the macro access point, the higher the power the mobile is transmitting in order to reach its macro access point with a required signal strength Hence at a given distance between the femto and the mobile, the received signal strength at the femto will increase as the distance between the mobile and the macro access point to which it is transmitting increases.

The femto access point 202 performs a beacon adjustment process 306 in response to determining that the measured signal strength of the mobile exceeds the threshold. The process 306 may completely shut off the beacon for a predetermined period of time or until the signal strength of the mobile no longer exceeds the threshold. The process may instead reduce the coverage area of the beacon, e.g., by temporarily reducing the beacon's power, to a predetermined level or to a level in which the signal strength of the mobile no longer exceeds the threshold. The time period over which the coverage area is reduced may be predetermined or determined dynamically by the femto access point based on signal strength measurements.

Figure 4:
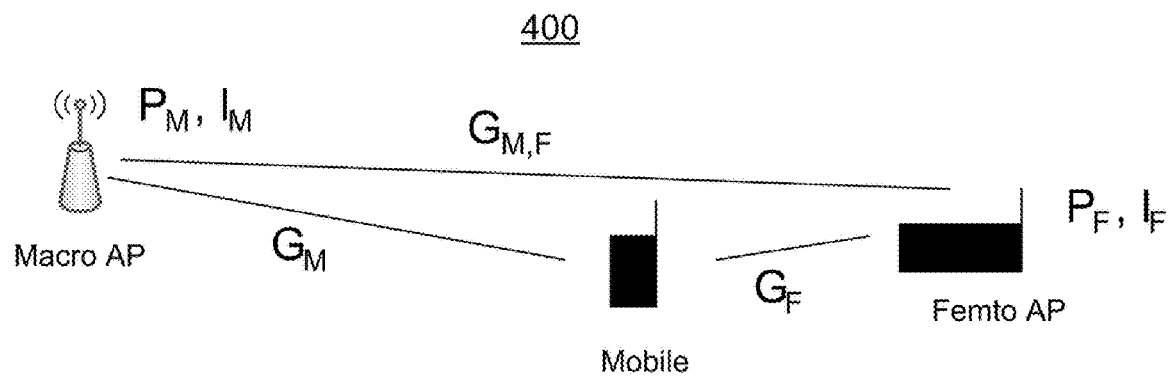
FIG. 4 is a flow diagram of active mobile detection.

Referring to FIG. 4, which illustrates a simple network that includes a macro access point, a femto access point, and a mobile, and the following equations, the threshold is determined using measured and empirical values. Terms PM and IM represent the transmit power on the forward link and ambient interference and noise level on the reverse link of the macro access point. Terms PF and IF represent the transmit power on the forward link and ambient interference and noise level on the reverse link of the femto access point. Term Pm represents the transmit power of the mobile. Term GM,F, represents the path gain between the macro and femto access points; term GM represents the path gain between the macro access point and the mobile; and term GF represents the path gain between the femto access point and the mobile. GM,F is detected by the femto access point during sniffing. Sniffing happens during initial configuration and then repeats maybe a couple of times a day. The femto access point 'sniffs' for surrounding femto and macro access points. Sniffing is different from looking for nearby mobiles—the former uses a forward link receiver, and the latter uses a reverse link receiver. Received power from the mobile at femto access-point is given by the equation:

$$[Pm+GF]=IM+\gamma m+(PM-PF)+KM, \text{ where all terms are in dB.}$$

The femto access point tries to determine when will the mobile have its voice quality degraded by the beacon. The terms (Pm+GF) represent the received power at the femto access point from the mobile. The first two terms (Im+γm) represent the received power from the mobile at the macro. KM is the dragging factor:

$$KM=(PF+GF)-(PM+GM).$$

The dragging factor KM is an indication of how far into the femto coverage region the mobile is. If KM is zero, mobile is exactly at boundary of coverage. If KM is negative, mobile is still inside the macro coverage region. If KM is positive, the mobile is inside the femto coverage region.

The term γm represents the uplink SINR (Ec/I0), and the threshold is where the mobile's forward link is affected by Γm,min, which represents the minimum SNR at which the mobile can support voice transmissions. Usually Γm,min is approximately −10 dB for voice, but this value can be a configurable parameter based on experimentation.

From the above equation, it is clear that KM=−Γm,min. The metric is computed as:

$$\text{Metric}=[Pm+GF]-IF,$$

In the case of a beacon, the term IF is the equivalent noise at the femto access point. When computing the threshold, the following assumptions are taken into account.

The noise figure at the femto access point is greater than that of the macro access point. The Ambient noise level at femto access point requires the difference between characteristics of macro and femto hardware. Generally, the macro receiver is better optimized to handle noise than the femto receiver, thus the macro receiver has a lower number for noise figure. The difference is typically a few dB, e.g., 10 dB, and is represented by ΔNF in the following equation:

$$NF,\text{femto}=NF,\text{macro}+\Delta NF.$$

$$IM=(N0+NF,\text{macro}+RoT\text{macro}),$$

where RoTmacro is the typical noise rise, and is typically about 3 dB. RoT (rise over thermal) of the macro network is selected so that the entire received power at the macro access point is only a few dB above the ambient noise level. The RoTmacro is a design parameter for the macro access point that is provided to the femto access point apriori, e.g., by an operator. The metric Z that is to be compared against a threshold is written as the following:

$$Z32\ (N0+NF,\text{femto})-\Delta NF+RoT\text{ dB}+(PM-PF)+\gamma m+ KM-(N0+NF,\text{femto}); \text{ which reduces to:}$$

$$Z=\gamma m-\Delta NF+RoT\text{ dB}+(PM-PF)+KM.$$

The foregoing equation is sufficient to compute the metric Z. More manipulation is done below to analyze Z based on proximity to macro. The relation holds that (PM−PF)~(−GM, F−Oc), where Oc is the designed coverage offset, based on a femto access point power allocation model. The final equation for the metric Z, is given as:

$$Z=\gamma m+KM-\Delta NF+RoT\text{ dB}-(GM,F+Oc).$$

The above terms are either measured, determined theoretically or heuristically. For example, γm, ΔNF, and RoTdB are determined heuristically, KM is a theoretical value, Oc is a predetermined value, and GM,F is measured.

Figure 5:
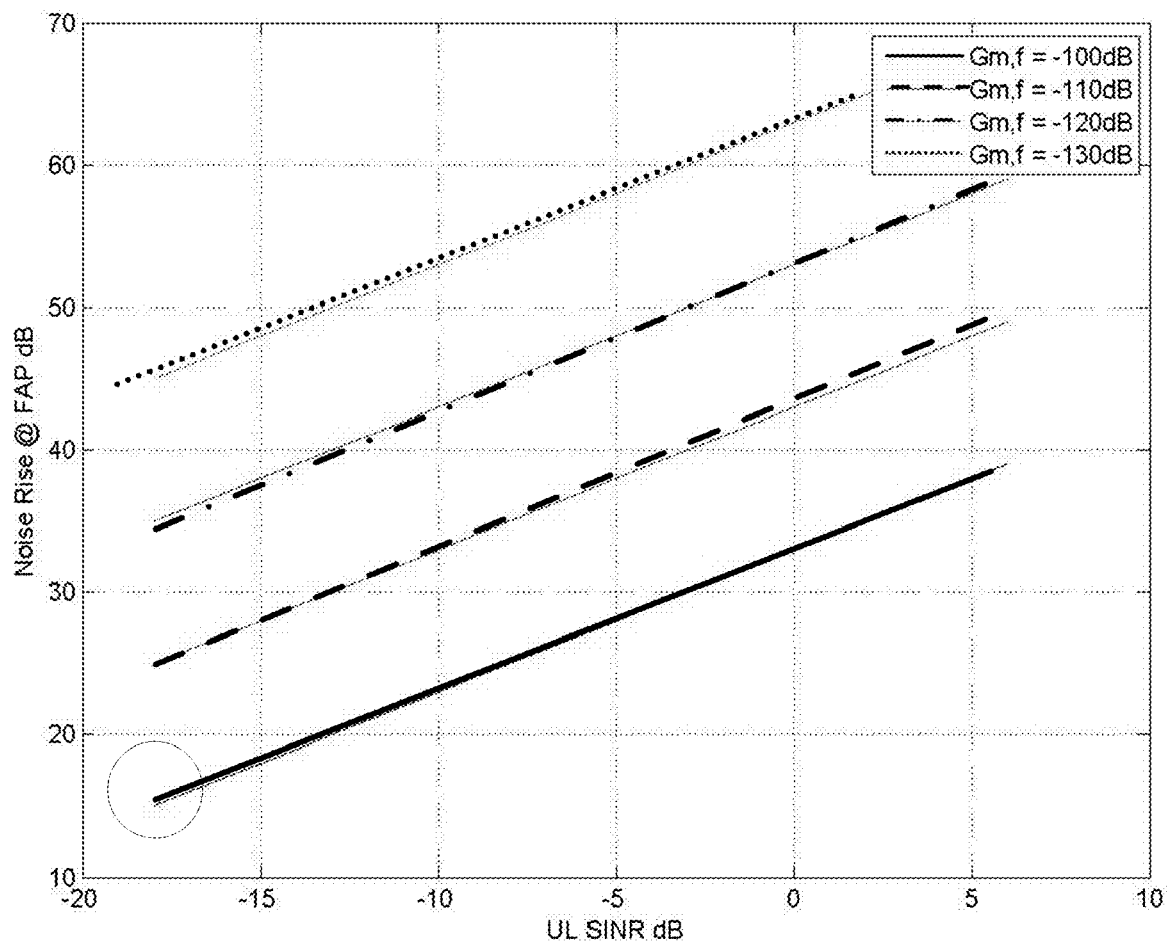
FIG. 5 is a plot of thresholds for various path gains.

Referring to FIG. 5, a plot 500 of thresholds for various path gains is shown based on the above final equation for the threshold T and following assumptions: ΔN,F=10 dB, RoT=3 dB, Oc=70 dB KM=10 dB, PM=40 dBm, and min PF=−20 dBm. The x-axis of the plot 500 is the reverse link SNR or γm. The y-axis is the metric Z. The metric Z is plotted for different path gains between the macro and femto access points as the threshold depends on how far away the femto is from the macro.

The macro access point can transmit either voice or data, however the system is designed to reduce or minimize beacon interference with voice. To do this, a conservative threshold (located inside the circle shown in the plot) is selected. If operating on bottom curve, with path gain of −100 dB, the threshold will be 15 dB above ambient noise. The thresholds for path gains of −110 dB, −120 dB, and −130 dB are set at approximately 25 dB, 35 dB, 45 dB, respectively.

The threshold depends on the distance between the femto access point and the macro access point. The coverage area of beacon also affects the threshold. The smaller the beacon coverage, the higher the threshold will be, since the mobile has to be closer to the femto before it will see interference from the beacon. For example, it is easier for the receiver to make a determination that the interference from the beacon is significant the further the threshold is above ambient noise. Although the threshold shown in plot 500 is set to the most conservative level, it may be set to a more appropriate level depending on whether the femto access point has knowledge that the mobile is transmitting voice or data. For example, the threshold may be set higher than the most conservative value to reduce the potential for false alarms. For example, if the threshold is triggered at 10 m for voice and 15 m for data. At 15 m, although the voice communications between the macro access point and the mobile are not affected, the femto access point would still modify, e.g., turn off, the beacon. Thus, in some scenarios, setting the threshold to the most conservative level could cause the beacon to be modified unnecessarily.

The detection and measurement steps 302 and 304 described above in FIG. 3 may be implemented in various ways. In some embodiments, these steps are performed during a silence period over which the data-only receiver stops its normal transmit and receiving functions. The silence interval is the period that is standardized by the 3GPP2; standards, where the EV-DO base station and the mobiles connected to it can stop transmitting and so are free to perform other functions, perhaps in a proprietary manner. The duration and periodicity of the silence interval is broadcast by the base station as defined in the 3GPP2 standards. During the silence period, the femto access point may take measurements without any impact to mobile, e.g., should the mobile try to access the femto access point during the sniffing period.

If there are no active calls on data-only side of the femto network, there is generally no impact to the performance experience at the mobile. However, a situation could arise where the receiver is used exactly at time when mobile tries to initiate contact with the femto access point using the Access Probe mechanism as defined in the EV-DO standards. However, this would not have a significant impact on the mobile as it will try again to contact the femto access point after a certain period of time, nominally set to 0.5 seconds, over which time the femto access point will have easily finished measuring the mobile's signal strength. Thus the probability of losing more than one probe during a measuring sequence is insignificant.

During an active call between a mobile and the femto access point, some packet losses could occur during the sniffing periods, however, most of the packets can be retrieved using retransmissions mechanisms already available in the conventional standards. Thus, the degradation of call is negligible.

Generally, it is preferable to not to restrict the detection and measurement steps to the silence period even though such restriction would eliminate impact on the mobile. The femto access point does not have control over a silence period, and the frequency with which it occurs is typically not short enough for the femto access point to make sufficiently frequent measurements. For example, the silence period generally occurs approximately every 56 seconds. Thus if a beacon is transmitted every 15-30 seconds, by restricting detection to only the silence periods, the femto access point would miss 4 beacon scans. As a result, the mobile experiences 4 interrupts from the beacon before femto access point can discover the mobile and shuts its beacon off.

Although many of the techniques described above employ the 1xEV-DO air interface standard, the techniques are also applicable to other CDMA (wideband as well as narrow band) and non-CDMA air interface technologies.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims. The following are examples for illustration only and not to limit the alternatives in any way. The techniques described herein can be performed in a different order and still achieve desirable results.

What is claimed is:

1. A computer-implemented method performed at a first access point for reducing beacon interference, the method comprising:
   estimating whether a mobile device is located within a coverage area serviced by the first access point, the mobile device communicating with a second access point, the first access point configured to transmit a beacon for attracting mobile devices;
   determining a reverse link signal strength of a signal transmitted by the mobile device to the second access point;
   using the signal strength as a measure of received signal strength from the mobile device;
   using the measure to estimate the amount of interference caused by the beacon to the mobile;
   varying a threshold based on a transmit power of the second access point, the threshold indicating a power level that causes the beacon to interfere with communications between the mobile device and the second access point
   determining the power exceeds the threshold; and
   modifying the beacon to reduce the beacon interference with the communications.

2. The method of claim 1, further comprising listening for signals transmitted by nearby mobiles at different frequencies used for communicating with other access points, including the second access point.

3. The method of claim 1, wherein determining a power comprises temporarily using a data-only receiver to detect the signal.

4. The method of claim 1, wherein modifying the beacon comprises shutting off the beacon or reducing a coverage area of the beacon.

5. The method of claim 1, further comprising:
   measuring a path gain between the first and second access points; and
   determining the threshold based on the path gain.

6. An access point configured to transmit a beacon for attracting idle mobile devices, the access point comprising:
   a receiver for transmitting and receiving voice and data; and
   a processor configured to:
      cause the receiver to periodically listen for mobile devices located within a coverage area serviced by the access point that are communicating with an other access point;
      determine a power of a signal transmitted by a mobile device to the other access point;
      vary a threshold based on a transmit power of the second access point, the threshold indicating a power level that causes the beacon to interfere with communications between the mobile device and the second access point
      determining the power exceeds the threshold; and
      modify the beacon to reduce interference of the beacon with the communications.

7. The access point of claim 6, wherein the receiver comprises a first component for transmitting and receiving voice and a second component for transmitting and receiving data only; and wherein the second component periodically suspends normal transmitting and receiving function to listens for the mobile devices.

8. The access point of claim 6, wherein the processor modifyes the beacon by shutting off the beacon or reducing a coverage area of the beacon.

9. The access point of claim 6, wherein the processor is further configured to:
   measure a path gain between the first and second access points; and
   determine the threshold based on the path gain.

10. The access point of claim 6, wherein the receiver is a first receiver and further comprising a second receiver transmitting and receiving voice and data.

11. A computer program product, tangibly stored on a computer-readable device of a first access point, the computer program product comprising instructions operable to cause a programmable processor to:
    estimate whether a mobile device is located within a coverage area serviced by the first access point, the mobile device communicating with a second access point, the first access point configured to transmit a beacon for attracting mobile devices;
    determine a reverse link signal strength of a signal transmitted by the mobile device to the second access point;
    use the signal strength as a measure of received signal strength from the mobile device;
    use the measure to estimate the amount of interference caused by the beacon to the mobile;
    vary a threshold based on a transmit power of the second access point, the threshold indicating a power level that causes the beacon to interfere with communications between the mobile device and the second access point
    determine that the power exceeds the threshold; and
    modify the beacon to reduce the beacon interference with the communications.

12. The computer program product of claim 11, comprising further instructions operable to cause the programmable processor to listen for signals transmitted by nearby mobiles at different frequencies used for communicating with other access points, including the second access point.

13. The computer program product of claim 11, comprising further instructions operable to cause the programmable processor to temporarily use a data-only receiver to detect the signal.

14. The computer program product of claim 11, comprising further instructions operable to cause the programmable processor to shut off the beacon or reducing a coverage area of the beacon.

15. The computer program product of claim 11, comprising further instructions operable to cause the programmable processor to:
    measure a path gain between the first and second access points; and
    determine the threshold based on the path gain.

* * * * *

UNITED STATES PATENT AND TRADEMARK OFFICE
CERTIFICATE OF CORRECTION

PATENT NO. : 7,907,571 B2
APPLICATION NO. : 12/495125
DATED : March 15, 2011
INVENTOR(S) : Balaji Raghothaman et al.

It is certified that error appears in the above-identified patent and that said Letters Patent is hereby corrected as shown below:

Column 9, line 55, Claim 6, delete "an other" and insert -- another --, therefor.

Column 10, line 8, Claim 7, delete "listens" and insert -- listen --, therefor.

Column 10, line 11, Claim 8, delete "modifyes" and insert -- modifies --, therefor.

Signed and Sealed this
Seventeenth Day of May, 2011

David J. Kappos
*Director of the United States Patent and Trademark Office*